US011429522B2

(12) United States Patent
Shaharabany et al.

(10) Patent No.: US 11,429,522 B2
(45) Date of Patent: Aug. 30, 2022

(54) STORAGE DELTA COMPRESSION

(71) Applicant: Western Digital Technologies, Inc., San Jose, CA (US)

(72) Inventors: Amir Shaharabany, Kochav Yair (IL); Shay Vaza, Alfey Menashe (IL)

(73) Assignee: Western Digital Technologies, Inc., San Jose, CA (US)

( * ) Notice: Subject to any disclaimer, the term of this patent is extended or adjusted under 35 U.S.C. 154(b) by 10 days.

(21) Appl. No.: 17/183,148

(22) Filed: Feb. 23, 2021

(65) Prior Publication Data

US 2022/0114088 A1 Apr. 14, 2022

Related U.S. Application Data

(60) Provisional application No. 63/089,775, filed on Oct. 9, 2020.

(51) Int. Cl.
*G06F 3/06* (2006.01)
*G06F 12/02* (2006.01)

(52) U.S. Cl.
CPC ........ *G06F 12/0246* (2013.01); *G06F 3/0608* (2013.01); *G06F 3/0656* (2013.01); *G06F 3/0673* (2013.01); *G06F 12/0292* (2013.01); *G06F 2212/401* (2013.01); *G06F 2212/7201* (2013.01)

(58) Field of Classification Search
CPC .. G06F 12/0246; G06F 3/0608; G06F 3/0656; G06F 3/0673; G06F 12/0292; G06F 2212/401; G06F 2212/7201
See application file for complete search history.

(56) References Cited

U.S. PATENT DOCUMENTS 10,248,336 B1 * 4/2019 Koujalagi ........... G06F 11/1484
2019/0079681 A1 * 3/2019 Trika .................... G06F 3/0679

* cited by examiner

*Primary Examiner* — Arpan P. Savla
*Assistant Examiner* — Trang K Ta
(74) *Attorney, Agent, or Firm* — Patterson + Sheridan, LLP; Steven H. VerSteeg

(57) ABSTRACT

The present disclosure generally relates to more efficient use of a delta buffer. To utilize the delta buffer, an efficiency can be gained by utilizing absolute delta entries and relative delta entries. The absolute delta entry will include the type of delta entry, the L2P table index, the L2P table offset, and the PBA. The relative delta entry will include the type of delta entry, the L2P table offset, and the PBA offset. The relative delta entry will utilize about half of the storage space of the absolute delta entry. The relative delta entry can be used after an absolute delta entry so long as the relative delta entry is for data stored in the same block as the previous delta entry. If data is stored in a different block, then the delta entry will be an absolute delta entry.

8 Claims, 8 Drawing Sheets

Absolute Delta Entry Structure

| bits | Name | bits | description |
|---|---|---|---|
| 0-31 | type | 1 | absolute write or relative write |
| | L2P_table_part_index | 15 | |
| | Offset_in_L2P_table_part | 13 | |
| | spare | 3 | |
| | | | |
| | | | |
| 32-64 | PBA | 28 | |
| | spare | 4 | Or used for other purposes |
| | | | |
| | | | |

FIG. 3A

Relative Delta Entry Structure

| bits | Name | bits | description |
|---|---|---|---|
| 0-31 | type | 1 | absolute write or relative write |
| | Offset_in_L2P_table_part | 13 | |
| | PBA offset | 14 | Distance from last absolute PBA |
| | spare | 4 | Or used for other purposes |
| | | | |
| | | | |
| ~~32-64~~ | | | |
| | | | |
| | | | |
| | | | |

FIG. 3B

Example parameters:
NUM_OF_REGIONS = 64
LBA units(block size) = 4KB
L2P_TABLE_PART_SIZE = 32 MB (8192 LBA's)

Legend

| | Absolute_Delta_L2P_entry | |
|---|---|---|
| TYPE = Abs | L2P_table_part_index | PBA |

| | Relative_Delta_L2P_entry | |
|---|---|---|
| TYPE = Rel | offset_in_L2P_table_part | PBA_offset |

Region 0

| A | 25 | 101 | 40060 |
| R | 102 | 18 | |
| R | 1739 | 22 | |
| A | 879 | 7296 | 55001 |
| R | 2724 | 68 | |
| A | 25 | 101 | 40090 |
| R | 8191 | 89 | |
| R | 2521 | 989 | |
| R | 7549 | 3979 | |
| R | 78 | 7389 | |
| A | 25 | 3489 | 58943 |
| R | 601 | 101 | |
| A | 25 | 5896 | 22024 |
| R | 3645 | 45 | |

Region 1

| A | 26 | 25 | 40018 |
| R | 0 | 59 | |
| R | 4589 | 785 | |
| R | 7836 | 3543 | |
| R | 587 | 7579 | |
| A | 26 | 2578 | 58357 |
| R | 3458 | 1 | |
| R | 289 | 785 | |
| R | 1387 | 3543 | |
| A | 26 | 2569 | 22587 |
| R | 358 | 69 | |

Region 63

| A | 88 | 85 | 40005 |
| R | 1589 | 38 | |
| R | 985 | 77 | |
| A | 2598 | 0 | 40080 |
| A | 88 | 30 | 40095 |
| R | 8191 | 20 | |
| R | 3 | 25 | |
| R | 1002 | 42 | |
| R | 5045 | 5378 | |
| R | 676 | 7895 | |
| A | 88 | 0 | 59020 |
| R | 0 | 47 | |
| R | 8191 | 98 | |
| A | 88 | 2569 | 22875 |
| R | 5986 | 78 | |

FIG. 4

| RAM [KB] | 20 | | |
|---|---|---|---|
| | W/O regions | W regions | W regions REL write |
| regions | 1 | 64 | 64 |
| regions directory | 0 | 256 | 256 |
| next buffer | 0 | 4 | 4 |
| first entry size | 8 | 8 | 8 |
| entry size | 8 | 8 | 4 |
| buffer size | 20480 | 128 | 128 |
| buffer count | 1 | 158 | 158 |
| entries per buffer | 2560 | 15 | 30 |
| total entries | 2560 | 2370 | 4740 |
| empty entries | 0 | 480 | 960 |
| Empty RAM [byte] | 0 | 3840 | 3840 |
| active entries | 2560 | 1890 | 3780 |
| GAT part flush RW 1GB - total entries | 155 | 114 | 229 |
| data pages per cleanup RW 1GB | 19 | 14 | 28 |

FIG. 8

STORAGE DELTA COMPRESSION

CROSS-REFERENCE TO RELATED APPLICATIONS

This application claims benefit of U.S. provisional patent application Ser. No. 63/089,775, filed Oct. 9, 2020, which is herein incorporated by reference.

BACKGROUND OF THE DISCLOSURE

Field of the Disclosure

Embodiments of the present disclosure generally relate to more efficient delta buffer utilization via compression.

Description of the Related Art

Flash storage logical to physical (L2P) updates are queued in a delta buffer prior to updating the L2P table in the storage media. The delta buffer utilization has many impacts over the device storage. Random write (RW) performance and write amplification factor (WAF) and even random read (RR) performance can be impacted.

The delta buffer size is set according to the optimal size that satisfies the requirements of the storage system. RW performance requires a very large delta to maximize the ratio of host write and management write. The delta buffer size, however, is limited by the RAM available, scan time requirements, and alignment to storage write page size.

One manner to address the delta issue is to maintain the L2P table as a queue of L2P entries. Logical block address (LBA) and physical block address (PBA) and mapping run length are used as the storage mapping in the delta buffer. However, the amount of delta entries that can be present is limited by the delta buffer size divided by the delta buffer entry size. For a 10 KB RAM with an entry size of 8 bytes, the maximum amount of entries is 1280 entries. If the storage WAF and RW requires more than 1280 entries, more RAM can be allocated, which increases costs of the device.

Therefore, there is a need in the art for more efficient delta utilization.

SUMMARY OF THE DISCLOSURE

The present disclosure generally relates to more efficient use of a delta buffer. To utilize the delta buffer, an efficiency can be gained by utilizing absolute delta entries and relative delta entries. The absolute delta entry will include the type of delta entry, the L2P table index, the L2P table offset, and the PBA. The relative delta entry will include the type of delta entry, the L2P table offset, and the PBA offset. The relative delta entry will utilize about half of the storage space of the absolute delta entry. The relative delta entry can be used after an absolute delta entry so long as the relative delta entry is for data stored in the same block as the previous delta entry. If data is stored in a different block, then the delta entry will be an absolute delta entry.

In one embodiment, a data storage device comprises: one or more memory devices; and a controller coupled to the one or more memory devices, wherein the controller is configured to: determine that a plurality of entries for a delta buffer logical to physical (L2P) table correspond to a same data block; create an absolute delta L2P entry, wherein the absolute delta L2P entry comprises a first number of bits; store the absolute delta L2P entry in the delta buffer L2P table; create a relative delta L2P entry, wherein the relative delta L2P entry comprises a second number of bits and wherein the first number of bits is greater than the second number of bits; and store the relative delta L2P entry in the delta buffer L2P table.

In another embodiment, a data storage device comprises: one or more memory devices; and a controller coupled to the one or more memory devices, wherein the controller is configured to: encode a first delta logical to physical (L2P) entry; determine that the first delta L2P entry is an absolute entry; enter the first delta L2P entry into a delta buffer, wherein the first delta L2P entry has a delta entry physical block address (PBA) equal to a PBA; encode a second delta L2P entry; determine that the second delta L2P entry is a relative entry; and enter the second delta L2P entry into the delta buffer wherein the second delta L2P entry has a delta entry PBA offset equal to an offset from the PBA.

In another embodiment, a data storage device comprises: one or more memory devices; and means to enter a plurality of delta logical to physical (L2P) entries into a delta buffer, wherein at least one entry of the plurality of delta L2P entries contains information relative to another entry of the plurality of delta L2P entries.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3A is an illustration of an absolute delta entry structure, according to one embodiment.

FIG. 3B is an illustration of a relative delta entry structure, according to one embodiment.

FIG. 4 is a schematic illustration of L2P mapping compression delta entries, according to one embodiment.

FIG. 8 is a schematic illustration of efficient delta buffer usage, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to more efficient use of a delta buffer. To utilize the delta buffer, an efficiency can be gained by utilizing absolute delta entries and relative delta entries. The absolute delta entry will include the type of delta entry, the L2P table index, the L2P table offset, and the PBA. The relative delta entry will include the type of delta entry, the L2P table offset, and the PBA offset. The relative delta entry will utilize about half of the storage space of the absolute delta entry. The relative delta entry can be used after an absolute delta entry so long as the relative delta entry is for data stored in the same block as the previous delta entry. If data is stored in a different block, then the delta entry will be an absolute delta entry.

Figure 1:
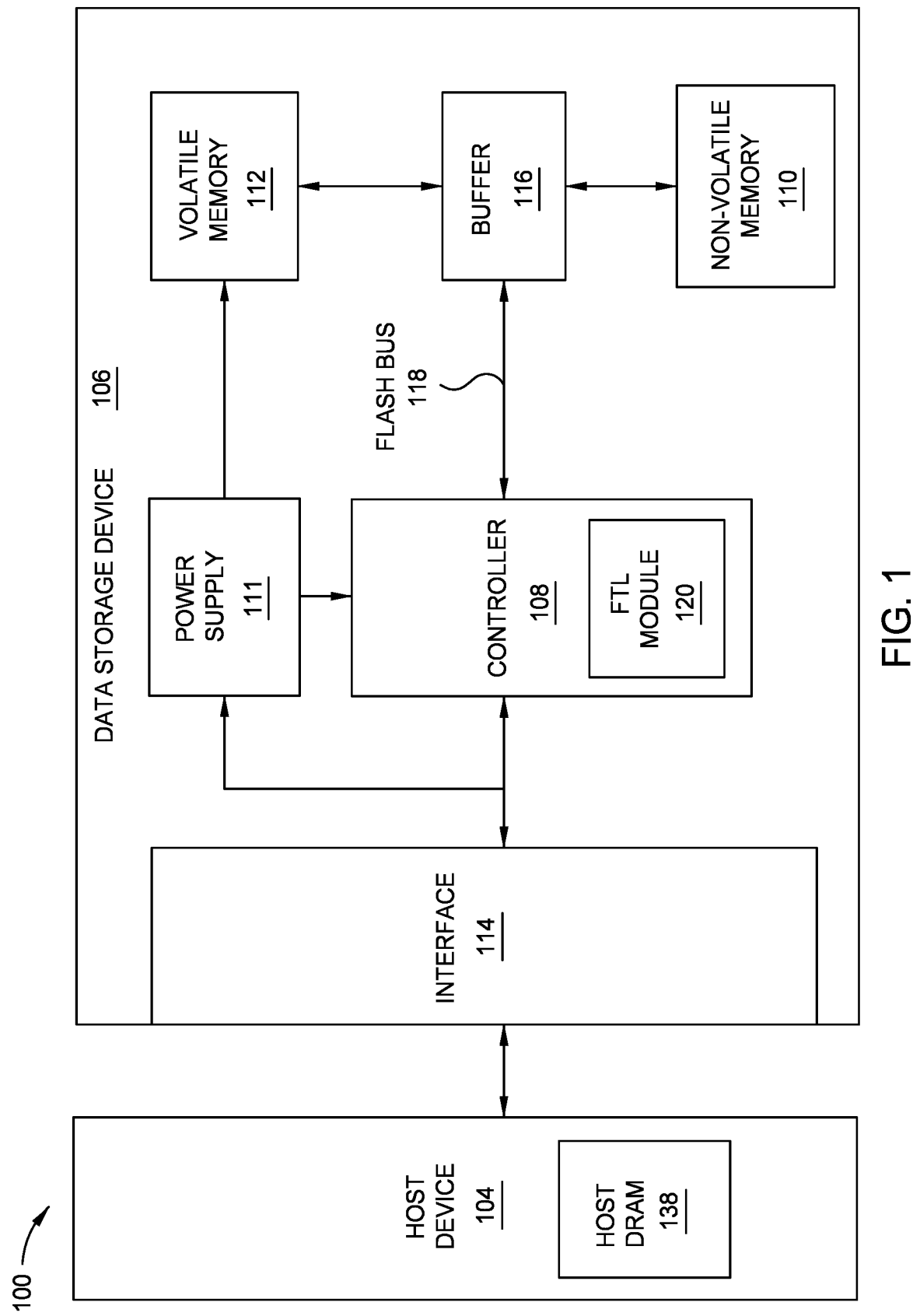
FIG. 1 is a schematic block diagram illustrating a storage system in which data storage device may function as a storage device for a host device, according to one embodiment.

FIG. 1 is a schematic block diagram illustrating a storage system 100 in which data storage device 106 may function as a storage device for a host device 104, according to one embodiment. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 stores and/or retrieves data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices. NVM 110 may be configured to store and/or retrieve data in response to a command from the host device 104. For instance, a memory device of NVM 110 may receive data and a message from the controller 108 that instructs the memory unit to store the data. Similarly, the memory device of NVM 110 may receive a message from the controller 108 that instructs the memory device to retrieve data. In some examples, each of the memory devices may be referred to as a die. In some examples, a single physical chip may include a plurality of dies (i.e., a plurality of memory units). In some examples, each memory device may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory device of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices. NVM flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. As illustrated in FIG. 1, volatile memory 112 may consume power received from the power supply 111.

Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Furthermore, the volatile memory 112 may store a logical-to-physical (L2P) table to track the logical block address (LBA) and the physical block address (PBA) of the data stored on the NVM 110. A L2P delta table may also be stored on the volatile memory 112. The L2P delta table stores any changes not yet committed to the L2P table, such that the L2P delta table is a table that tracks any changes or deviations from the L2P table. Entries stored in the L2P delta table are used to update the L2P table.

The data storage device 106 includes a controller 108 which may manage one or more operations of the data storage device 106. For instance, the controller 108 may manage the reading of data from and/or the writing of data to the NVM 110. Furthermore, the controller 108 is coupled to the buffer 116 via a flash bus 118, where the flash bus 118 facilitates the transfer of data between the controller 108 and the buffer 116. In one embodiment, the flash bus 118 may facilitate the transfer of data between the NVM 110 and the controller 108 and/or between the volatile memory 112 and the controller 108. In some embodiments, when the data storage device 106 receives a write command from the host device 104, the controller 108 may initiate a data storage command to store data to the NVM 110 and monitor the progress of the data storage command.

The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110. The controller further includes a first flash transition layer (FTL) module 120. The first FTL module 120 may include one or more FTL tables configured to track the location of the newly updated data in the NVM 110, such that each read command for the newly updated data is routed to the appropriate location, ensure that newly programmed pages of the NVM 110 are evenly distributed across the NVM 110 to aid in wear leveling, and track the location of the outdated or invalid data, such that the one or more pages including the outdated or invalid data may be erased in a flash management operation such as garbage collection.

Figure 2A:
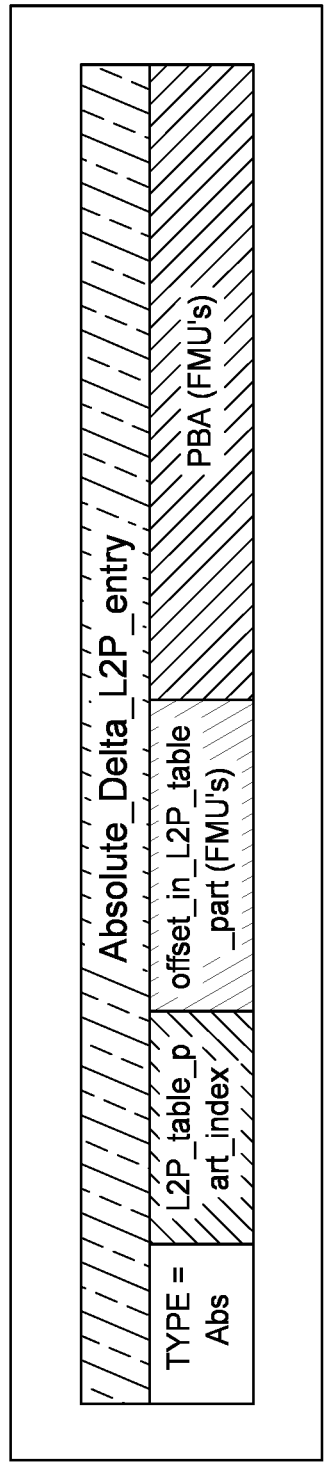
FIG. 2A is an illustration of an absolute delta L2P entry, according to one embodiment.
Figure 2B:
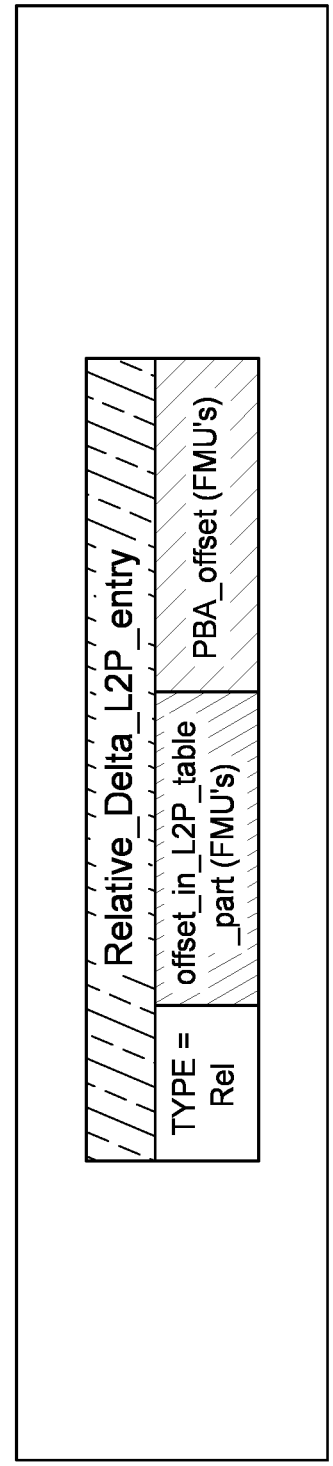
FIG. 2B is an illustration of a relative delta L2P entry, according to one embodiment.

FIGS. 2A and 2B are illustrations of various delta L2P entries, according to various embodiments. The L2P delta table of the volatile memory, such as the volatile memory 112 of FIG. 1, stores a plurality of delta L2P entries, where the one or more of the plurality of delta L2P entries is an absolute delta L2P entry 200 and the remaining one or more of the plurality of delta L2P entries is a relative delta L2P entry 250. Each of the plurality of delta L2P entries may describe a position on the L2P delta table. Table 1, shown below, is an example of a L2P delta table.

TABLE 1

|  | Region 0 | Region 1 | ... | Region 62 | Region 63 |
| --- | --- | --- | --- | --- | --- |
| Table Part 1 | 0 | 1 | ... | 62 | 63 |
| Table Part 2 | 64 | 65 | ... | 126 | 127 |
| Table Part 3 | 128 | 129 | ... | 190 | 191 |
| ... | ... | ... | ... | ... | ... |
| Table Part n | 64*(n − 1) | 64*(n − 1) + 1 | ... | 64*(n − 1) + 62 | 64*(n − 1) + 63 |

The L2P delta table includes a plurality of regions and a plurality of table parts. Each region of the plurality of regions describes a portion of the total LBA span and each table part is the resolution (i.e., the size of data) of the LBA and the PBA. In one embodiment, the number of regions is about 64 regions. In another embodiment, the number of regions is greater than about 64 regions. The LBA range (e.g., 0-191) is a continuous range that wraps around to the next table part after reaching the last region of the current table part. For example, in table part 1, 0-63 LBAs are shown. The 65th LBA, LBA 64, is located on the next table part and in region 0. Furthermore, an offset in the table part is a number of locations from the first location (i.e., region 0) of a table part. For example, LBA 65 has an offset of 1 because LBA 65 is the 2nd LBA of the table part 2.

For a given LBA, such as LBA 12,345,678, the region, table part, and the offset in the table part may be calculated using the following formulas:

table_part=LBA/table size in LBA units, offset_in_table_part=LBA % table size in LBA units, and region=table_part % region count.

The "/" is an integer divide operator, where the resulting value is rounded down. The "%" is an integer Modulus operator, where the result is the remainder of the "/" operation.

For example, when the LBA units has a size of about 4096 B, the total table size in LBA units is about 8192 B because the total table size in LBA size units is calculated as LBA+PBA=total table size in LBA size units, where the size of the PBA is substantially equal to the size of the LBA. Furthermore, as illustrated by Table 1, the region count is 64 (i.e., the number of regions between Region 0 and Region 63).

The table_part is calculated as 12,345,678/8192 or 1507.04. However, because the "/" is an operation that rounds the value down, the resulting table_part number is 1507. The offset_in_table_part is calculated as 12,345,678% 8192 or 1507.04. However, because the "%" is a Modulus operation, the resulting offset_in_table_part is 334. The region is calculated as 1507% 64 or 35. Therefore, when looking up the LBA 12,345,678 in Table 1, the LBA 12,345,678 is found at region 35, table part 1507 with an offset of 334. When new data, such as data from a host device 104 of FIG. 1, is written over a LBA range, such as the LBA 12,345,678 previously described, the new LBA mapping information is inserted to L2P delta table as a delta L2P entry.

The absolute delta L2P entry 200 is a standalone or an absolute entry with an independent translation capability, were the LBA and the PBA are written in full resolution. The absolute delta L2P entry 200 does not depend on any other structure. The relative delta L2P entry 250 may be a compressed delta L2P entry that includes less information than the absolute delta L2P entry 200. One or more delta L2P entries may follow the absolute L2P entry 200, such that the each of the relative delta L2P entries depends on the prior absolute delta L2P entry 200. For example, each of the relative delta L2P entries that follow the absolute L2P entry 200 have the same table_part as the absolute L2P entry 200.

FIG. 2A is an illustration of an absolute delta L2P entry 200, according to one embodiment. The absolute delta L2P entry 200 includes a type field, a L2P table part index field, a first offset in the L2P table portion field, and a PBA field. The type field for an absolute delta L2P entry 200 is denoted by "Type=Abs", where "Abs" stands for absolute. The "L2P_table_part_index" is the table_part previously described. The "offset_in_L2P_table_part" is the offset_in_table_part previously described, where the first offset is determined by the number of flash management units (FMUs) offset from the first LBA of the relevant table part. The "PBA" is the location of the physical block data stored on the NVM, such as the NVM 110 of FIG. 1.

FIG. 2B is an illustration of a relative delta L2P entry 250, according to one embodiment. The relative delta L2P entry 250 includes a type field, a second offset in the L2P table portion field, and a PBA field. The type field for a relative delta L2P entry 250 is denoted by "Type=Rel", where "Rel" stands for relative. The "offset_in_L2P_table_part" is the offset_in_table_part previously described, where the second offset is determined by the number of flash management units (FMUs) offset from the first LBA of the relevant table part. The "PBA" is the location of the physical block data stored on the NVM, such as the NVM 110 of FIG. 1. The relative delta L2P entry 250 provides the full L2P address according to the previous absolute delta L2P entry 200. In some embodiments, by utilizing the relative delta L2P entry 250 structure, storage space gains (i.e., less memory used) may be about 4 B per relative delta L2P entry 250 used compared to the storage space used by the absolute delta L2P entry 200.

FIG. 3A is an illustration of an absolute delta entry structure, according to one embodiment. The absolute delta entry structure of FIG. 3A may be the absolute delta L2P entry 200 of FIG. 2A. For example, in a storage device, such as the data storage device 106 of FIG. 1, the storage LBA units are in size of about 4 KB. When the capacity of the storage device is about 1 TB (i.e., the NVM capacity), 256 M LBAs are present (1024 GB/4 KB). Because 256 M is 2 to the power of 28, 28 bits are required to map a LBA. However, because most storage system architectures are aligned to a byte (i.e., 8 bits), about 32 bits (4 B) are required to map a LBA.

A first bit is utilized to describe the type of the L2P delta entry. Furthermore, the table part size of about 32 KB maps to 32 KB/4 or about 8K entries. Thus, about 13 bits are used to describe the offset in the table part. The table part count or the L2P_table_part_index is calculated as 256 M (LBAs)/8K (table part size) or about 32K indexes. The about 32K indexes translates to about 15 bits. Thus, the total bit size of the LBA is about 1+15+13+3 (spare bits) or about 32 bits. Because the PBA size is substantially equal to the LBA size, the total size of the absolute delta entry structure is about 64 bits. The PBA size includes 28 bits utilized for the PBA and 4 additional bits associated with the PBA or used for other purposes. In some embodiments, the number of bits of the absolute delta entry structure or a first number of bits is between about 55 bits and about 64 bits, where the lower bound illustrates no spare bits and the upper bound illustrates including the spare bits previously described.

FIG. 3B is an illustration of a relative delta entry structure, according to one embodiment. The relative delta entry structure of FIG. 3B may be the relative delta L2P entry 250 of FIG. 2B. When the storage device continues to write to the same open block, the relative delta entry structure may be utilized. The relative delta entry structure includes a second number of bits, where the second number of bits is less than the first number of bits described in FIG. 3A. The second number of bits may be between about 28 bits and 32 bits, as illustrated by the relative delta entry structure. The decrease in the bit size may be attributed to the not having the "L2P_table_part_index" field and including a PBA offset instead of the PBA.

The PBA offset describes the distance from the last absolute PBA, such as the PBA described in the absolute delta entry structure of FIG. 3A. The absolute PBA has a bit size of about 28 bits, whereas the PBA offset has a bit size of about 14 bits. However, the "offset_in_L2P_table_part field" of both the absolute delta entry structure and the relative delta entry structure includes the same number of bits. In addition, the spare bits of may be utilized to hold additional indexes of the table part in the region queue, such that allocated bits for the PBA offset or other entry information may be reduced.

FIG. 4 is a schematic illustration of L2P mapping compression delta entries, according to one embodiment. The L2P mapping compression delta entries illustrates the mapping of the absolute delta entry structure of FIG. 3A and the relative delta entry structure of FIG. 3B. For example, in Region 0, the first entry is an absolute delta L2P entry having a table part index of 25, an offset of 101, and PBA of 40,060. The second entry is a relative delta L2P entry that includes an offset of 102 and a PBA offset of 18. The PBA offset of 18 signifies the PBA distance away from the previous absolute delta L2P entry. Likewise, the third entry is a relative L2P entry that includes an offset of 1739 and a PBA offset of 22, where the PBA offset of 22 is an offset from the PBA of the first entry. In one embodiment, the second entry and the third entry have a substantially similar number of bits because both entries are relative delta L2P entries. Furthermore, because data is written sequentially to the NVM, the PBA offset is increasing for each relative delta L2P entry.

When data is written to a different L2P_table_part_index, such as the fourth entry, an absolute delta L2P entry is written to the region indicating a change in the table part index. The absolute delta L2P entry of the fourth entry follows the same format as the absolute delta L2P entry of the first entry. The next absolute delta L2P entry is the sixth entry. The sixth entry returns back to the first open block, the block associated with the first absolute delta L2P entry.

A new absolute delta L2P entry may be written after a threshold value of the PBA offset is exceeded. The threshold value may be about 16K or about 14 bits. For example, the third absolute delta L2P entry having the fields 25, 101, and 40,090 is followed by the fourth absolute delta L2P entry having the fields of 25, 3489, and 58,943. Though the third absolute delta L2P entry and the fourth absolute delta L2P entry have the same table part entry, the fourth absolute delta L2P entry is written as an absolute delta L2P entry because the entry has exceeded the threshold value.

Figure 5:
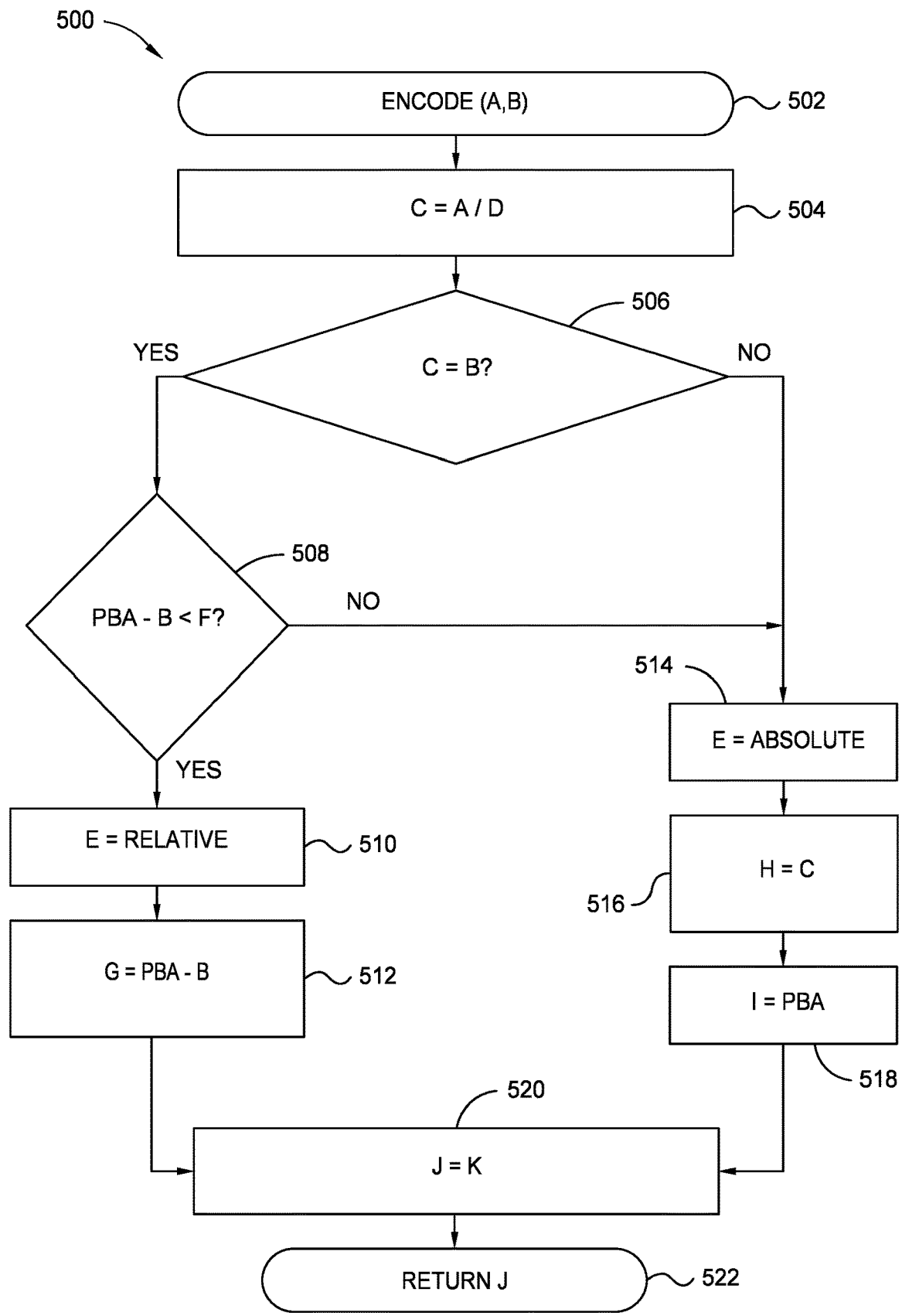
FIG. 5 is a flowchart illustrating a method of encoding LBA to delta L2P entries, according to one embodiment.

FIG. 5 is a flowchart illustrating a method 500 of encoding LBA to delta L2P entries, according to one embodiment. At block 502, a controller, such as the controller 108 of FIG. 1, receives an encode command to encode a LBA to a delta L2P entry of a first data block, where the encode command includes a L2P_pair (A) and a last_absolute_entry field (B). At block 504, the controller calculates the table part index (C) using the formula, table_part=LBA/table size in LBA units (D), as described in FIGS. 2A and 2B. The table part index is written to the delta L2P entry. At block 506, the controller determines if the table part index calculated is the table part index of the last absolute entry of the same data block (i.e., the first data block).

If the calculated table part index is the same as the table part index of the last absolute entry of the same data block at block 506, then at block 508, the controller determines if the PBA offset threshold (F) has been exceeded. For example, the PBA offset threshold may be about 16 K or about 14 bits. If the PBA offset threshold has not been exceeded at block 508, then at block 510, the controller programs the delta L2P entry (E) as a relative delta L2P entry. At block 512, the controller calculates a PBA offset (G) from the previous absolute delta L2P entry, where the PBA offset is equal to an offset from the PBA of the data block. The PBA offset is calculated by subtracting the PBA of the last absolute entry from the current PBA.

However, if the calculated table part index is the different from the table part index of the last absolute entry of the same data block at block 506 or if the PBA offset threshold has been exceeded at block 508, then the controller programs the delta L2P entry as an absolute delta L2P entry at block 514. At block 516, the controller writes the table part index calculated at block 504 in the L2P table part index field (H). At block 518, the controller further writes the PBA to the PBA field of the absolute delta L2P entry (I).

At block 520, the controller calculates the offset in the table part using the formula, offset_in_table_part=LBA % table size in LBA units (J=K), as described in FIGS. 2A and 2B. The calculated offset is written to the delta L2P entry. At block 522, the delta L2P entry is returned.

Figure 6:
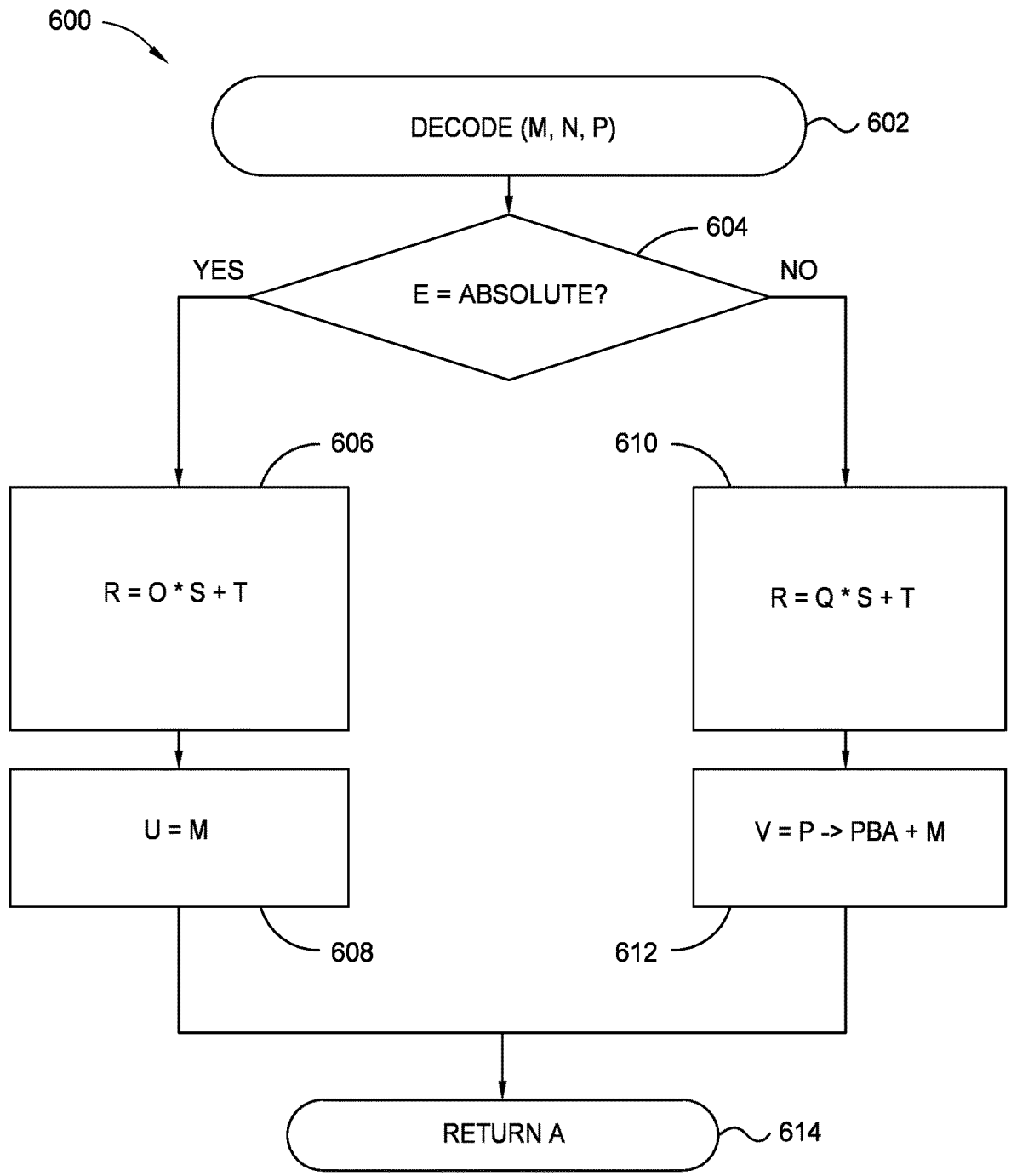
FIG. 6 is a flowchart illustrating a method of decoding LBA from delta L2P entries, according to one embodiment.

FIG. 6 is a flowchart illustrating a method 600 of decoding LBA from delta L2P entries, according to one embodiment. At block 602, a decode command is received by a controller, such as the controller 108 of FIG. 1. The decode command includes a delta L2P entry (M), a region ID (N), and a previous absolute entry reference (P). At block 604, the controller determines if the delta L2P entry is an absolute delta L2P entry.

If the delta L2P entry is an absolute delta L2P entry at block 604, then at block 606, the controller determines the LBA associated with the absolute delta L2P entry (R) by calculating the table part index (O) times the table part size (S) plus the offset (T). At block 608, the controller sets the PBA of the absolute delta L2P entry (U) as the PBA associated with the LBA. At block 614, the LBA is returned.

However, if the delta L2P entry is a relative delta L2P entry at block 604, then at block 610, the controller determines the LBA associated with the relevant delta L2P entry by calculating the table part index of the previous absolute delta L2P entry (Q) times the table part size plus the offset. At block 612, the controller further determines the PBA of the relative delta L2P entry (V) by adding the PBA of the previous absolute delta L2P entry and the PBA offset together. At block 614, the LBA is returned.

Figure 7:
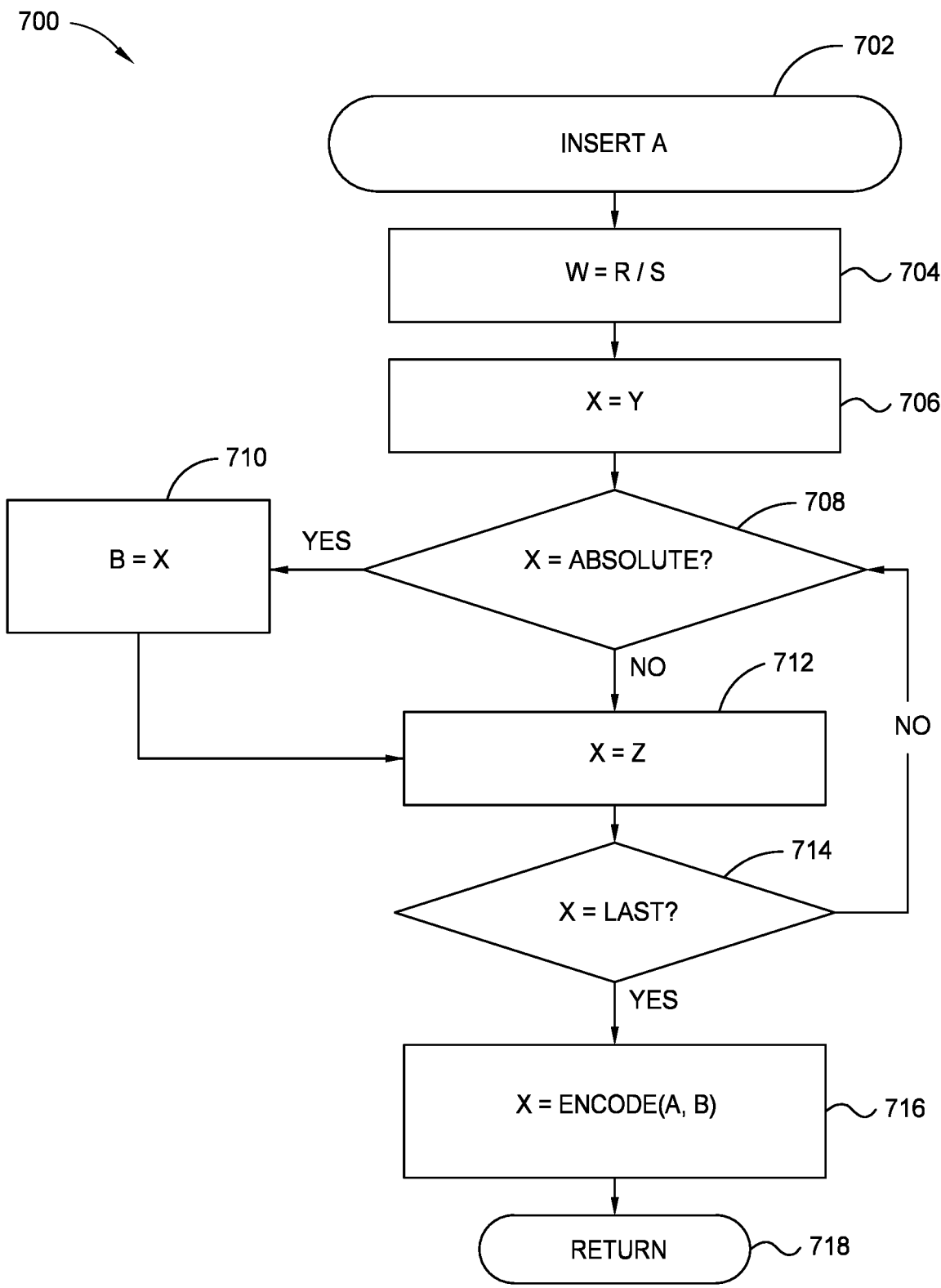
FIG. 7 is a flowchart illustrating a method of inserting an L2P entry to a delta buffer, according to one embodiment.

FIG. 7 is a flowchart illustrating a method 700 of inserting an L2P entry to a delta buffer, according to one embodiment. The delta buffer may be the L2P delta table described in FIGS. 2A and 2B. At block 702, a controller, such as the controller 108 of FIG. 1, receives a command to insert a L2P entry to the delta buffer. At block 704, the controller calculates the table part index (W) using the formula, table_part=LBA/table size in LBA units, as described in FIGS. 2A and 2B. At block 706, the controller sets the current L2P entry (X) as the first entry of the first region (Y). A first entry in any region of the delta buffer or the L2P delta table is an absolute delta L2P entry. At block 708, the controller determines if the current entry type is an absolute entry type.

If the current entry type is an absolute entry type at block 708, then at block 710, the controller sets the current entry as the last absolute entry. After setting the current entry as the last absolute entry at block 708 or if the current entry type is not an absolute entry type at block 708, then at block 712, the controller sets the current entry as the next entry (Z). At block 714, the controller determines if the current entry is the last entry. If the current entry is not the last entry at block 714, then the method 700 returns to determining if the current entry type is an absolute entry at block 708. However, if the current entry is the last entry at block 714, then at block 716, the controller encodes the current L2P entry as the current entry in the delta buffer. At block 718, the method 700 is finished and the encoded L2P entry is returned.

FIG. 8 is a schematic illustration of efficient delta buffer usage, according to one embodiment. The element illustrated in FIG. 8 are not intended to be limiting, but to provide an example of a possible embodiment. For a RAM size of about 20 KB, three delta buffer usages are exemplified. The first delta buffer usage does not include regions, the second delta buffer usage includes regions with only absolute entries, and the third delta buffer usage includes regions with both absolute and relative entries. The third delta buffer usage includes an empty RAM size of about 3780 Bytes, whereas the second delta buffer usage includes an empty RAM size of about 1890 Bytes and the first delta buffer usage includes an empty RAM size of about 0 Bytes. By using the third delta buffer usage that includes both the absolute entries and the relative entries, the overall improvement in space may be about 47%. Furthermore, the buffer size of the second delta buffer usage and the third delta buffer usage is about 128 bytes and are significantly smaller than the buffer size of the first delta buffer usage, where the buffer size of the first delta buffer usage is about 20,480 bytes.

By using a relative delta entry in a delta buffer that includes the type of delta entry, the L2P table offset, and the PBA offset, the amount of delta buffer utilized is about half of the storage space of the absolute delta entry. Thus, the delta buffer can be utilized more efficiently and data storage device functioning is improved.

In one embodiment, a data storage device comprises: one or more memory devices; and a controller coupled to the one or more memory devices, wherein the controller is configured to: determine that a plurality of entries for a delta buffer logical to physical (L2P) table correspond to a same data block; create an absolute delta L2P entry, wherein the absolute delta L2P entry comprises a first number of bits; store the absolute delta L2P entry in the delta buffer L2P table; create a relative delta L2P entry, wherein the relative delta L2P entry comprises a second number of bits and wherein the first number of bits is greater than the second number of bits; and store the relative delta L2P entry in the delta buffer L2P table. The absolute delta L2P entry comprises a type of entry, a L2P table part index, a first offset in the L2P table, and a physical block address (PBA). The relative delta L2P entry comprises a type of entry, a second offset in the L2P table, and a PBA offset. The first offset in the L2P table and the second offset in the L2P table comprise an equal number of bits, and wherein the PBA comprises a greater number of bits than the PBA offset. The first number of bits is between about 55 and 64 bits. The second number of bits is between about 28 and about 32 bits. The controller is further configured to: create a second relative delta L2P entry, wherein the second relative delta L2P entry comprises a third number of bits; and store the second relative delta L2P entry in the delta buffer L2P table. The third number of bits is equal to the second number of bits.

In another embodiment, a data storage device comprises: one or more memory devices; and a controller coupled to the one or more memory devices, wherein the controller is configured to: encode a first delta logical to physical (L2P) entry; determine that the first delta L2P entry is an absolute entry; enter the first delta L2P entry into a delta buffer, wherein the first delta L2P entry has a delta entry physical block address (PBA) equal to a PBA; encode a second delta L2P entry; determine that the second delta L2P entry is a relative entry; and enter the second delta L2P entry into the delta buffer wherein the second delta L2P entry has a delta entry PBA offset equal to an offset from the PBA. The controller is further configured to perform the following for the absolute entry: set a delta entry type equal to absolute; set a delta entry L2P table part index equal to L2P table part index; and set the delta entry PBA equal to PBA. The controller is further configured to perform the following for the relative entry: set delta entry type equal to relative; and set delta entry PBA offset equal to PBA minus a last absolute entry PBA. The delta entry PBA offset comprises fewer bits than the delta entry PBA. The relative entry does not include a L2P table part index. The controller is further configured to: decode a delta buffer entry; and determine whether the decoded delta buffer entry is an absolute delta entry. The controller is further configured to calculate the offset from the PBA. The delta buffer comprises a plurality of regions and wherein a first entry in any region of the delta buffer is an absolute entry. The delta buffer comprises at least 64 regions.

In another embodiment, a data storage device comprises: one or more memory devices; and means to enter a plurality of delta logical to physical (L2P) entries into a delta buffer, wherein at least one entry of the plurality of delta L2P entries contains information relative to another entry of the plurality of delta L2P entries. The at least one entry comprises a first plurality of bits and the another entry comprises a second plurality of bits and wherein the first plurality of bits is less than the second plurality of bits. The data storage device further comprises means to encode and decode the plurality of delta L2P entries.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   one or more memory devices; and
   a controller coupled to the one or more memory devices, wherein the controller is configured to:
      determine that a plurality of entries for a delta buffer logical to physical (L2P) table correspond to a same data block;
      create an absolute delta L2P entry, wherein the absolute delta L2P entry comprises a first number of bits;
      store the absolute delta L2P entry in the delta buffer L2P table;
      create a relative delta L2P entry, wherein the relative delta L2P entry comprises a second number of bits and wherein the first number of bits is greater than the second number of bits; and
      store the relative delta L2P entry in the delta buffer L2P table.

2. The data storage device of claim 1, wherein the absolute delta L2P entry comprises a type of entry, a L2P table part index, a first offset in the L2P table, and a physical block address (PBA).

3. The data storage device of claim 2, wherein the relative delta L2P entry comprises a type of entry, a second offset in the L2P table, and a PBA offset.

4. The data storage device of claim 3, wherein the first offset in the L2P table and the second offset in the L2P table comprise an equal number of bits, and wherein the PBA comprises a greater number of bits than the PBA offset.

5. The data storage device of claim 1, wherein the first number of bits is between about 55 and 64 bits.

6. The data storage device of claim 5, wherein the second number of bits is between about 28 and about 32 bits.

7. The data storage device of claim 1, wherein the controller is further configured to:
   create a second relative delta L2P entry, wherein the second relative delta L2P entry comprises a third number of bits; and
   store the second relative delta L2P entry in the delta buffer L2P table.

8. The data storage device of claim 7, wherein the third number of bits is equal to the second number of bits.

* * * * *